United States Patent Office 3,331,627
Patented July 18, 1967

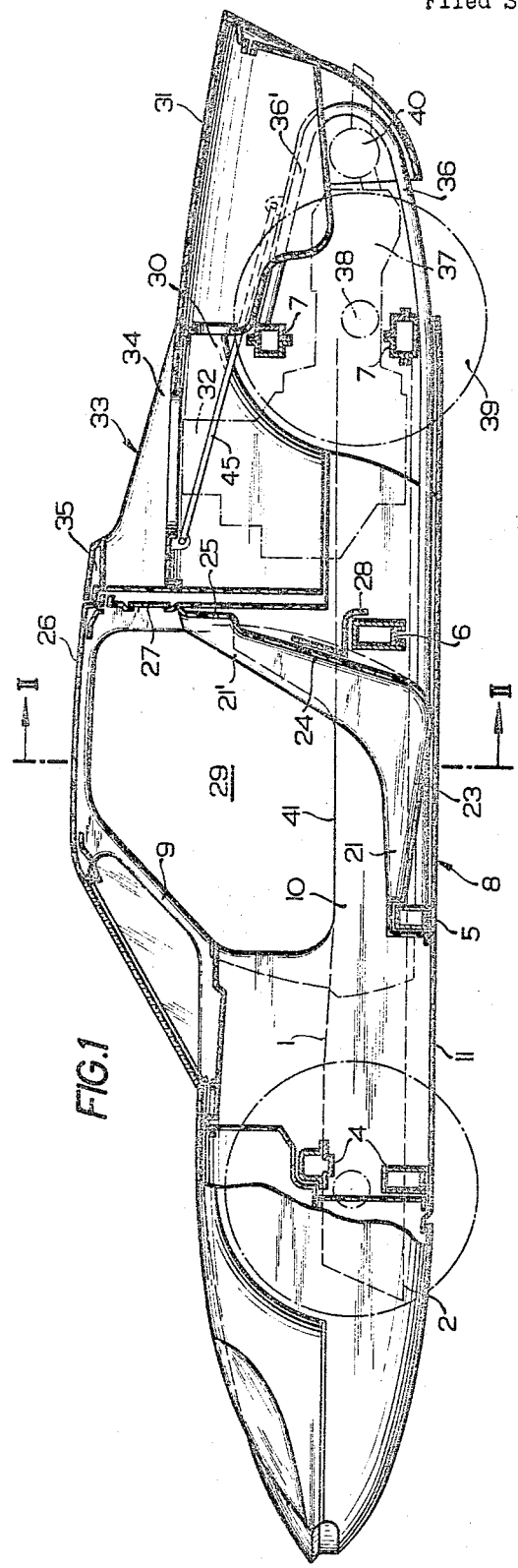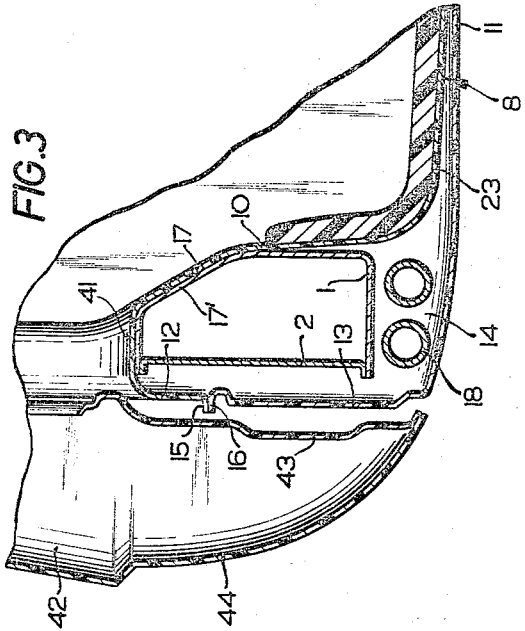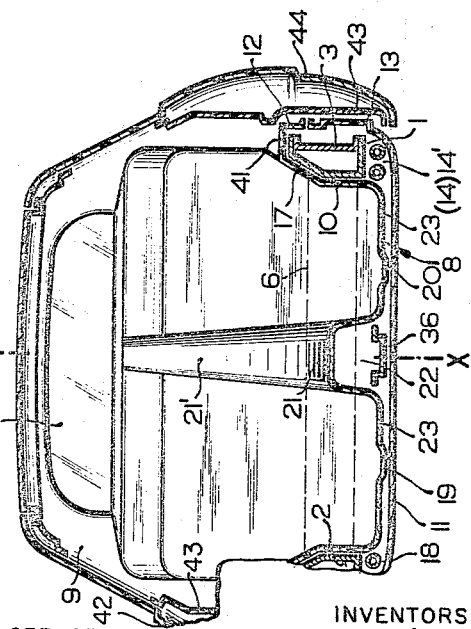

3,331,627
VEHICLE BODY
Gerhard Albert Richard Schroder, Ditzingen, Kreis Leonberg, and Jobst Rainer Srock, Stuttgart-Leinfelden, Germany, assignors to Firma Dr. Ing. h.c. F. Porsche KG., Stuttgart-Zuffenhausen, Germany
Filed Sept. 14, 1964, Ser. No. 396,041
Claims priority, application Germany, Sept. 28, 1963, P 32,678
12 Claims. (Cl. 296—31)

The present invention relates to a motor vehicle with a vehicle body made of plastic material which encloses a frame assembly made of sheet metal stampings or pressed-out parts.

It is known in the prior art to manufacture plastic vehicle bodies by the use of dish-shaped or shell-shaped form parts which are reinforced at particularly highly loaded or stressed places by reinforcing inserts in the form of sheet metal stampings or pressed-out parts. However, the manufacture of such vehicle bodies is connected with great expenditures from a production and time point of view, whence with the customary constructions one is willing to abandon a self-supporting type of plastic body construction and provides as bearing support for the suspension and drive unit of the motor vehicle subframe made of sheet metal stampings or a tubular framework upon which is placed the plastic vehicle body. However, by the use of such an arrangement, an essential advantage of the plastic body construction is lost, namely the corrosion resistance especially within the most endangered area at the vehicle underside since the sheet metal stampings or pressed-out parts of the subframe are exposed to all weather influences.

According to the present invention, these disadvantages are avoided in that the floor assembly of the vehicle body is constituted by two nested, trough-shape form-parts whose rim portions, arched or curved toward one another, enclose the frame longitudinal bearers while forming a hollow bearer whereby the rim portions of one of the two form parts, connected with each other at a distance from the longitudinal bearers, are secured at the longitudinal bearer members. As a result thereof, with a protective encasing of the subframe by reason of the nested box-shaped cross sections made of sheet metal steel and of plastic, a very stable torsion-resistant floor assembly is obtained at the same time on which may be assembled the other structural groups or subassemblies of the vehicle body with the use of simple and large-surfaced dish-shaped or shell-shaped parts. Consequently, a supporting framework is achieved by the present invention with which the advantages of a plastic body are safeguarded to the fullest extent and the expenditures necessary therefor are no longer than with the usual constructions. Especially by reason of the fact that the inner form part of the floor assembly extends with the rim portions thereof above the frame longitudinal bearers and is connected with the outer form part below the bottom edges of the frame at locally spaced places on both sides of the center longitudinal plane of the vehicle body, the result is a simple connection of the form parts enclosing the frame longitudinal bearer members which does not crowd or reduce the passenger space. In order to obtain sufficient rigidity of the floor between the frame longitudinal bearers, the inner form part is provided in the center longitudinal plane of the vehicle body with an oppositely directed upright channel pressed into trough shape which, together with the outer form part, forms a hollow body that extends parallel to the hollow bodies of the rim portions. The inner form part preferably constructed between its rim portions and the channel as a seating trough which continues in one piece into a backrest that forms at the same time a cross wall of the vehicle body and is connected with the roof thereof. By the use of such an arrangement there is created with a single form part both the floor of the passenger space as well as also the requisite partition wall between the engine or luggage space and the passenger space without necessitating therefor complicated manufacturing forms or dies. For reason of simplicity the cross wall containing the rear window is supported on a cross bearer of the frame and is reinforced by the channel which extends between the seating trough and the floor up to approximately the height of the rear window. The channel thus serves for the reinforcement of the floor- and crosswalls of the passenger space a swell as lateral support of the seats. An assembly favorable from a manufacturing point of view of the floor assembly is achieved by the fact that the outer form part is provided with upwardly curved rim portions which extend at a distance underneath the frame longitudinal bearers and are connected by means of horizontal outwardly angularly bent rim flanges directly with corresponding rim flanges of the inner form part. The curved rim portions and the rim flanges of the outer form part are covered within the area of the door sill by the inner wall of the door that extends below the frame longitudinal bearer. The outer form part is advantageously reinforced on the inner side thereof by a sheet metal profile strip which is covered within the area of the floor assembly by the channel of the inner form part. Undesired vibrations of the large-surfaced floor shell are thereby avoided in a far-reaching manner.

For motor vehicles with a drive unit arranged in the rear part of the vehicle, favorable conditions result as regards the securing and arrangement of further structural subassemblies of the body, if the sheet metal profile strip arranged in the center longitudinal plane of the vehicle body extends into the engine space and encloses a part of the drive unit in a bow-like manner. The sheet metal profile strip or plate subtends an enclosing angle of about 180° and is connected with a frame cross bearer above and in front of the axis of rotation of the rear wheels. The strip or plate forms in this manner together with the cross bearer of the frame, a framework for the support and securing unit. Simultaneously therewith the sheet metal profile strip serves for supporting the rear body of the vehicle body which extends up to the cross wall of the floor assembly arranged inside of the wheel base of the vehicle. The rear body pivotally connected at the sheet metal profile strip, preferably in such a manner as to be tiltable, is made of a plastic form part with a reinforcing bow-shaped portion extending over the entire width of the vehicle body which lies as extension of the roof directly outside of the rear window arranged in the cross walls.

Accordingly, it is an object of the present invention to provide a vehicle body made of plastic material which eliminates in a simple and relatively inexpensive manner the aforementioned drawbacks and shortcomings encountered with the prior art constructions.

Another object of the present invention resides in the provision of a self-supporting type body construction which utilizes large-surfaced plastic body panels.

A further object of the present invention resides in the provision of a vehicle body made of plastic material, especially of a self-supporting type body of plastic material which protects the metallic subframe used for reinforcing the plastic body against external influences.

Still another object of the present invention resides in the provision of a vehicle body made of plastic material which is so constructed and arranged as to produce a very sturdy torsion-resistant floor assembly on which the other body parts may be readily mounted even when using large-surfaced body panels.

Still a further object of the present invention resides in the provision of a vehicle body made of plastic material in which a metallic supporting framework is used without endangering the advantages realizable by the use of the plastic body and without necessitating larger expenditures than necessary heretofore.

Another object of the present invention resides in the provision of a self-supporting type body utilizing plastic panels and metallic frame bearers in which the plastic body is so connected with the metallic bearers as not to reduce the available passenger space.

Still another object of the present invention resides in the provision of a self-supporting type body construction of plastic material in which the floor subassembly is relatively rigid yet may be assembled in an extremely simple manner.

A further object of the present invention resides in the provision of a self-supporting type body construction made of plastic material in which relative few body parts are needed by combining into unitary body panels functionally related portions of the body.

Another object of the present invention resides in the provision of a self-supporting type body construction of plastic material which not only facilitates manufacture but also assembly thereof.

Still another object of the present invention resides in the provision of a vehicle body made of plastic material in which large-surfaced body panels may be used while at the same time effectively preventing vibrations and droning notwithstanding the large surfaces of the unitary body panels.

These and other objects, features and advantages of the present invention will become more obvious from the following description when taken in connection with the accompanying drawing which shows, for purposes of illustration only, one embodiment in accordance with the present invention, and wherein FIGURE 1 is a longitudinal cross sectional view through the plastic vehicle body of a sports car with the drive unit arranged in the rear of the vehicle and provided with a floor assembly in accordance with the present invention;

FIGURE 2 is a cross sectional view through the vehicle body taken along line II—II of FIGURE 1, and FIGURE 3 is a cross section, on an enlarged scale, through a frame longitudinal bearer and the form parts enclosing the same of the vehicle floor subassembly in accordance with the present invention.

Referring now to the drawing wherein like reference numerals are used throughout the various views to designate like parts, the vehicle frame designated therein by reference numeral 1 and consisting of pressed out sheet metal parts or stampings, is composed of two box-shaped longitudinal bearers 2 and 3 arranged at a distance from one another and of several box-shaped cross bearers 4, 5, 6, and 7 which interconnect with each other the longitudinal bearers 2 and 3. The floor assembly generally designated by reference numeral 8 of the vehicle body 9 is secured at the longitudinal bearers 2 and 3. The floor assembly 8 consists of two trough-shaped form parts 10 and 11 made of plastic material which are arranged in nested relationship to each other, that is, of which the inner form part 10 lies within the outer form part 11. The rim portions 12 of the inner form part 10 and the rim portions 13 of the outer form part 11 are curved toward one another and form hollow bearers 14 and 14' which enclose the frame longitudinal bearers 2 and 3. The rim portions 12 and 13 of the form parts 10 and 11 enclose the frame longitudinal bearers 2 and 3 with a spacing and are provided with horizontally angularly bent rim flanges 15 and 16, respectively (FIG. 3). The rim flanges 15 and 16 are connected directly with each other, for example, by suitable gluing, bonding or cementing. An inclined surface 17 arranged near the rim portions 12 serves for the connection of the form parts 10 and 11 with the frame longitudinal bearers 2 and 3. The inclined surface 17 is adheringly secured in any conventional manner at a corresponding countersurface 17' provided at the longitudinal bearers 2 and 3. The outer form part 11 also extends at a distance below the longitudinal bearers 2 and 3 so that between the longitudinal bearers 2 and 3, on the one hand, and the form part 11, on the other, a space remains for the accommodation of indicated lines 18 for the fuel, the heating air and the like. The inner form part 10 is connected with the outer form part 11 on both sides of the center longitudinal plane X—X of the vehicle body 9 at locally spaced places by means of pressed out portions or indentations 19 and 20. The form part 10 is provided in the center longitudinal plane X—X with an oppositely directed upright channel 21 formed into a trough which, together with the form part 11, forms a further hollow bearer 22 that extends parallel to the hollow bearers 14 and 14'. The form part 10 is constructed between the channel 21 and the rim portions 12 on each side as seating trough 23. The seating trough 23 extends in one piece into a backrest 24 which simultaneously forms a cross wall 25 of the vehicle body 9 and is connected with the roof 26 thereof. The cross wall 25 contains a rear window 27 and is supported by a bracket 28 on the cross bearer 6 of the frame. For purposes of reinforcing the cross wall 25, the channel 21 is extended with the end 21' thereof from the floor between the seating troughs 23 up to below the rear window 27. A rear body 31 adjoins the cross wall 25 which separates the passenger space 29 from the engine space 30. The rear body 31 covers the schematically indicated drive unit 32. The body 31 of plastic material is made in one piece with a bow-shaped reinforcing part generally designated by reference numeral 33 extending over the entire width of the vehicle, whose center web portion 35 interconnecting the lateral leg portions 34 forms an extension of the roof 26. The rear body 31 is pivotally connected on a U-shaped sheet metal profile strip or plate 36 in such a manner as to be tiltable toward the rear. A link 45 is pivotally mounted at one end to the rear body 31 and at the other end to the profile strip or plate 36, thereby enabling the rear body 31 to be tilted to the rear. The sheet metal profile strip 36 arranged in the center longitudinal plane X—X of the vehicle body—like surfaces 17'—is adhesively arranged and/or mechanically secured at the inner side of the form part 11 of the floor assembly 8 in any conventional manner and extends from the frame cross bearer 5 into the engine space 30 whereby its end 36' bent about an angle of 180° encloses the change-speed transmission 37 of the drive unit 32. The end 36' of the strip or band 36 is connected above and in front of the axis 38 of the indicated rear wheels 39 with the frame cross bearers 7 and serves for the support of the rear body 31 as well as of the muffler 40 of the drive unit. The rim portions 12 and 13 of the form parts 10 and 11 and the rim flanges 15 and 16 thereof are covered within the area of the sill 41 of the vehicle door 42 by the inner wall 43 (FIG. 3) of the door. The vehicle door 42 extends for that purpose to below the lower edge of the frame longitudinal bearers 2 and 3. The outer door wall 44 forms thereby the extension of the shape and configuration of the form part 11 of the vehicle floor.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:
1. A motor vehicle having a vehicle body of plastic material which encloses a frame structure of pressed-out metal parts, comprising:
 a body floor assembly including two trough-shaped form parts, one of said two form parts being substantially disposed within the other,
 said frame structure including longitudinal bearers,
 a roof,
 said form parts being provided with rim portions curved toward one another to form substantially hollow box-shaped bearers and enclosing with the rim portions thereof said longitudinal bearers,
 said form parts being connected with one another with a spacing from said longitudinal bearers,
 and the rim portions of one of said form parts being secured at said longitudinal bearers,
 the inner form part being provided substantially in the center longitudinal plane of the vehicle with an oppositely directed channel having approximately upright leg portions and being pressed out into trough shape,
 said channel forming together with the outer form part a hollow body extending substantially parallel to said hollow bodies constituted by said rim portions,
 the inner form part being constructed between the rim portions thereof and said channel as seating trough which continues in one piece into a backrest forming simultaneously a crosswall of the body and being connected with the roof thereof.

2. A motor vehicle having a vehicle body of plastic material which encloses a frame structure of pressed-out metal parts, comprising:
 a body floor assembly including two trough-shaped form parts, one of said two form parts being substantially disposed within the other,
 said frame structure including longitudinal bearers and cross bearer means,
 a roof,
 said form parts being provided with rim portions curved toward one another to form substantially hollow box-shaped bearers and enclosing with the rim portions thereof said longitudinal bearers,
 said form parts being connected with one another with a spacing from said longitudinal bearers,
 and the rim portions of one of said form parts being secured at said longitudinal bearers,
 the inner form part being provided substantially in the center longitudinal plane of the vehicle with an oppositely directed channel having approximately upright leg portions and being pressed out into trough shape,
 said channel forming together with the outer form part a hollow body extending substantially parallel to said hollow bodies constituted by said rim portions,
 the inner form part being constructed between the rim portions thereof and said channel as seating trough which continues in one piece into a backrest forming simultaneously a crosswall of the body and being connected with the roof thereof,
 said cross wall containing a rear window,
 said cross wall being supported on said crossbearer means and being reinforced by said channel, said channel extending between the seat troughs from the floor assembly up to approximately the height of the rear window.

3. A motor vehicle having a vehicle body of plastic material which encloses a frame structure of pressed-out metal parts, comprising:
 a floor assembly including two trough-shaped form parts, one of said two form parts being disposed substantially within the other so as to define therebetween a tunnel-shaped space extending in a longitudinal direction,
 said frame structure including longitudinal bearers,
 said form parts being provided with rim portions curved toward one another to form substantially hollow box-shaped bearers and enclosing with the rim portions thereof said longitudinal bearers,
 said form parts being connected with one another with a spacing from said longitudinal bearers,
 and the rim portions of one of said form parts being secured at said longitudinal bearers,
 the outer form part being provided with upwardly curved rim portions which extend below said frame longitudinal bearers with a spacing and being provided with horizontal outwardly angularly bent rim flanges connected directly with corresponding rim flanges of the inner form part.

4. A motor vehicle having a vehicle body of plastic material which encloses a frame structure of pressed-out metal parts, comprising:
 a floor assembly including two trough-shaped form parts, one of said two form parts being disposed substantially within the other,
 said frame structure including longitudinal bearers,
 said form parts being provided with rim portions curved toward one another to form substantially hollow box-shaped bearers and enclosing with the rim portions thereof said longitudinal bearers,
 said form parts being connected with one another with a spacing from said longitudinal bearers,
 and the rim portions of one of said form parts being secured at said longitudinal bearers,
 the outer form part being provided with upwardly curved rim portions which extend below said frame longitudinal bearers with a spacing and being provided with horizontal outwardly angularly bent rim flanges connected directly with corresponding rim flanges of the inner form part,
 said vehicle body including door means having inner wall means, the rim portions and rim flanges of the outer form part being covered within the area of the door sill by the inner wall means of the door means and the inner wall means extending below the frame longitudinal bearers.

5. A motor vehicle having a vehicle body of plastic material which encloses a frame structure of pressed-out metal parts, comprising:
 a floor assembly including two trough-shaped form parts, one of said two form parts being disposed substantially within the other,
 said frame structure including longitudinal bearers,
 said form parts being provided with rim portions curved toward one another to form substantially hollow box-shaped bearers and enclosing with the rim portions thereof said longitudinal bearers,
 said form parts being connected with one another with a spacing from said longitudinal bearers,
 and the rim portions of one of said form parts being secured at said longitudinal bearers,
 the inner form part being provided substantially in the center longitudinal plane of the vehicle with an oppositely directed channel,
 the outer form part being provided with upwardly curved rim portions which extend below said frame longitudinal bearers with a spacing and being provided with horizontal outwardly angularly bent rim flanges connected directly with corresponding rim flanges of the inner form part,
 and sheet metal reinforcing means reinforcing the outer form part on the inside thereof, said reinforcing means being covered within the area of the floor assembly by the channel of the inner form part.

6. A motor vehicle having a vehicle body of plastic material which encloses a frame structure of pressed-out metal parts, comprising:
 a floor assembly including two trough-shaped form parts, one of said two parts being disposed substantially within the other, said frame structure including longitudinal bearers,
said form parts being provided with rim portions curved toward one another to form substantially hollow box-shaped bearers and enclosing with the rim portions thereof said longitudinal bearers,
said form parts being connected with one another with a spacing from said longitudinal bearers,
and the rim portions of one of said form parts being secured at said longitudinal bearers,
the inner form parts being provided substantially in the center longitudinal plane of the vehicle with an oppositively directed channel,
the outer form part being provided with upwardly curved rim portions which extend below said frame longitudinal bearers with a spacing and being provided with horizontal outwardly angularly bent rim flanges connected directly with corresponding rim flanges of the inner form part,
and sheet metal reinforcing means reinforcing the outer form part on the inside thereof, said reinforcing means being covered within the area of the floor assembly by the channel of the inner form part,
said reinforcing means being arranged within the center longitudinal plane of the vehicle body and extending into the engine space thereof, a drive unit within said engine space, the extension of said reinforcing means enclosing a part of said drive unit in a bow-like manner.

7. A motor vehicle having a vehicle body of plastic material which encloses a frame structure of pressed-out metal parts, comprising:
a floor assembly including tow trough-shaped form parts, one of said two form parts being disposed substantially within the other,
said frame structure including longitudinal bearers,
said form parts being provided with rim portions curved toward one another to form substantially hollow box-shaped bearers and enclosing with the rim portions thereof said longitudinal bearers,
said form parts being connected with one another with a spacing from said longituidnal bearers,
and the rim portions of one of said form parts being secured at said longitudinal bearers,
the inner form part being provided substantially in the center longitudinal plane of the vehicle with an oppositely directed channel,
the outer form part being provided with upwardly curved rim portions which extend below said frame longitudinal bearers with a spacing and being provided with horizontal outwardly angularly bent rim flanges connected directly with corresponding rim flanges of the inner form part,
and sheet metal reinforcing means reinforcing the outer form part on the inside thereof, said reinforcing means being covered within the area of the floor assembly by the channel of the inner form part,
said reinforcing means being arranged within the center longitudinal plane of the vehicle body and extending into the engine space thereof, a drive unit within said engine space, the extension of said reinforcing means enclosing a part of said drive unit in a bow-like manner, the angle subtended by said reinforcing means being about 180°, and means connecting said reinforcing means with a frame crossbearer means above and in front of the axis of rotation of the rear wheels.

8. A motor vehicle having a vehicle body of plastic material which encloses a frame structure of pressed-out metal parts, comprising:
a floor assembly including two trough-shaped form parts, one of said two form parts being disposed substantially within the other,
said frame structure including longitudinal bearers,
said form parts being provided with rim portions curved toward one another to form substantially hollow box-shaped bearers and enclosing with the rim portions thereof said longitudinal bearers,
said form parts being connected with one another with a spacing from said longitudinal bearers,
and the rim portions of one of said form parts being secured at said longitudinal bearers,
the inner form part being constructed between the rim portions thereof and said channel as seating trough which continues in one piece into a backrest forming simultaneously a crosswall of the body connected with the roof thereof,
the outer form part being provided with upwardly curved rim portions which extend below said frame longitudinal bearers with a spacing and being provided with horizontal outwardly angularly bent rim flanges connected directly with corresponding flanges of the inner form part, sheet-metal reinforcing means reinforcing the outer form part on the inside thereof, said reinforcing means being covered within the area of the floor assembly by the channel of the inner form part,
a rear body means also of plastic material secured on said reinforcing means, said rear body means extending to the cross wall arranged inside of the wheel base of the vehicle.

9. A motor vehicle having a vehicle body of plastic material which encloses a frame structure of pressed-out metal parts, comprising:
a body floor assembly including two trough-shaped form parts, one of said two form parts being sub- substantially disposed within the other,
said frame structure including longitudinal bearers, and cross bearer means,
a roof,
said form parts being provided with rim portions curved toward one another to form substantially hollow box-shaped bearers and enclosing with the rim portions thereof said longitudinal bearers,
said form parts being connected with one another with a spacing from said longitudinal bearers,
and the rim portions of one of said form parts being secured at said longitudinal bearers,
the inner form part being provided substantially in the center longitudinal plane of the vehicle with an oppositely directed channel having approximately upright leg portions and being pressed-out into trough shape,
the inner form being constructed between the rim portions thereof and said channel as seating trough which continues in one piece into a backrest forming simultaneously a crosswall of the body and being connected with the roof thereof,
said crosswall containing a rear window,
said crosswall being supported on said crossbearer means and being reinforced by said channel, said channel extending between the seat troughs from the floor assembly up to approximately the height of the rear window,
and sheet metal reinforcing means reinforcing the outer form part on the inside thereof, said reinforcing means being covered within the area of the floor assembly by the channel of the inner form part,
rear body means of plastic material secured on said reinforcing means, said rear body means extending to said cross wall arranged inside of the wheel base of the vehicle,
and pivotal connecting means connecting said rear body means with said reinforcing means to enable tilting of said rear body means at said reinforcing means, said rear body means being a plastic form part essentially consisting of a reinforcing bow-shaped member extending over the entire width of the vehicle body, said bow-shaped member being disposed substantially in the extension of the roof outside of the rear window arranged in said crosswall.

10. A motor vehicle having a vehicle body of plastic material which encloses a frame structure of pressed-out metal parts, comprising:
- a body floor assembly including two trough-shaped form parts, one of said two form parts being substantially disposed within the other,
- said frame structure including longitudinal bearers and cross bearer means,
- a roof,
- said form parts being provided with rim portions curved toward one another to form substantially box-shaped bearers and enclosing with the rim portions thereof said longitudinal bearers.
- said form parts being connected with one another with a spacing from said longitudinal bearers,
- and the rim portions of one of said form parts being secured at said longitudinal bearers,
- the inner form part being provided substantially in the center longitudinal plane of the vehicle with an oppositely directed channel having approximately upright leg portions and being pressed-out into trough shape,
- the inner form part being constructed between the rim portions thereof and said channel as seating trough which continues in one piece into a backrest forming simultaneously a crosswall of the body and being connected with the roof thereof,
- said crosswall containing a rear window,
- said crosswall being supported on said crossbearer means and being reinforced by said channel, said channel extending between the seat troughs from the floor assembly up to approximately the height of the rear window,
- and sheet metal means reinforcing the outer form part on the inside thereof, said reinforcing means being covered within the area of the floor assembly by the channel of the inner form part,
- said reinforcing means being arranged within the center longitudinal plane of the vehicle body and extending into the engine space, a drive unit within said engine space, and the extension of said reinforcing means enclosing a part of said drive unit in a bow-like manner, the angle subtended by said reinforcing means being about 180°, and means connecting said reinforcing means with a frame crossbearer means above and in front of the axis of rotation of the rear wheels,
- rear body means of plastic material secured on said reinforcing means, said rear body means extending to said cross wall arranged inside of the wheel base of the vehicle,
- and pivotal connecting means connecting said rear body means with said reinforcing means to enable tilting of said rear body means at said reinforcing means, said rear body means being a plastic form part essentially consisting of a reinforcing bow-shaped member extending over the entire width of the vehicle body, said bow-shaped member being disposed substantially in the extension of the roof outside of the rear window arranged in said cross wall.

11. A motor vehicle having a vehicle body of plastic material which encloses a frame structure of pressed-out metal parts, comprising:
- a body floor assembly including two trough-shaped form parts, one of said two form parts being substantially disposed within the other,
- said frame structure including longitudinal bearers and cross bearer means,
- a roof,
- said form parts being provided with rim portions curved toward one another to form substantially hollow box-shaped bearers and enclosing the rim portions thereof at said longitudinal bearers,
- said form parts being connected with one another with a spacing from said longitudinal bearers,
- and the rim portions of one of said form parts being secured at said longitudinal bearers,
- the inner form part being provided substantially in the center longitudinal plane of the vehicle with an oppositely directed channel having approximately upright leg portions and being pressed-out into trough shape,
- said channel forming together with the outer form part a hollow body extending substantially parallel to said hollow bodies constituted by said rim portions,
- the inner form part being constructed between the rim portions thereof and said channel as seating trough which continues in one piece into a backrest forming simultaneously a crosswall of the body and being connected with the roof thereof,
- said crosswall containing a rear window,
- said crosswall being supported on said crossbearer means and being reinforced by said channel, said channel extending between the seat troughs from the floor assembly up to approximately the height of the rear window,
- the outer form part being provided with upwardly curved rim portions which extend below said frame longitudinal bearers with a spacing and being provided with horizontal outwardly angularly bent rim flanges connected directly with corresponding rim flanges of the inner form part,
- and sheet metal reinforcing means reinforcing the outer form part on the inside thereof, said reinforcing means being covered within the area of the floor assembly by the channel of the inner form part,
- said reinforcing means being arranged within the center longitudinal plane of the vehicle body and extending into the engine space, a drive unit within said engine space, and the extension of said reinforcing means enclosing a part of said drive unit in a bow-like manner, the angle subtended by said reinforcing means being about 180°, and means connecting said reinforcing means with a frame crossbearer means above and in front of the axis of rotation of the rear wheels,
- rear body means of plastic material secured on said reinforcing means, said rear body means extending to said crosswall arranged inside of the wheel base of the vehicle,
- and pivotal connecting means connecting said rear body means with said reinforcing means to enable tilting of said rear body means at said reinforcing means, said rear body means being a plastic form part essentially consisting of a reinforcing bow-shaped member extending over the entire width of the vehicle body, said bow-shaped member being disposed substantially in the extension of the roof of the rear window arranged in said crosswall.

12. A motor vehicle having a vehicle body of plastic material which encloses a frame structure of pressed-out metal parts, comprising:
- a floor assembly including two trough-shaped form parts, one of said two form parts being disposed substantially within the other so as to define therebetween a tunnel-shaped space extending in a longitudinal direction,
- said frame structure including longitudinal bearers,
- said form parts being provided with rim portions curved toward one another to form substantially hollow box-shaped bearers and enclosing with the rim portions thereof said longitudinal bearers,
- said form parts being connected with one another with a spacing from said longitudinal bearers,
- and the rim portions of one of said form parts being secured at said longitudinal bearers,
- the other form part being provided with upwardly curved rim portions which extend below said frame longitudinal bearers with a spacing and being provided with horizontal outwardly angularly bent rim flanges connected directly with corresponding rim flanges of the inner form part at a point outside of said longitudinal bearers and between the top and bottom of said longitudinal bearers.

References Cited

UNITED STATES PATENTS

| 2,271,310 | 1/1942 | Schafer | 296—28 |
| 2,356,624 | 8/1944 | Schulz et al. | 296—28 |
| 2,814,524 | 11/1957 | Porsche et al. | 296—31 |
| 2,875,841 | 3/1959 | Henderson | 296—28 X |
| 2,950,701 | 8/1960 | De Stefani. | |
| 2,973,220 | 2/1961 | White | 296—31 |

FOREIGN PATENTS 1,202,866  7/1959  France.

BENJAMIN HERSH, *Primary Examiner.*

MILTON BUCHLER, *Examiner.*

E. E. PORTER, J. A. PEKAR, *Assistant Examiners.*